United States Patent [19]

Synosky et al.

[11] Patent Number: 5,437,876
[45] Date of Patent: Aug. 1, 1995

[54] WAX-FREE CHEWING GUMS WITH CONTROLLED SWEETENER RELEASE

[75] Inventors: Steven P. Synosky, Greenbrook, N.J.; Michael J. Greenberg, Northbrook, Ill.

[73] Assignee: Wm. Wrigley Jr. Company, Chicago, Ill.

[21] Appl. No.: 295,745

[22] PCT Filed: Mar. 2, 1993

[86] PCT No.: PCT/US93/01940
§ 371 Date: Aug. 30, 1994
§ 102(e) Date: Aug. 30, 1994

[87] PCT Pub. No.: WO93/17577
PCT Pub. Date: Sep. 16, 1993

[63] Continuation-in-part of PCT/US92/11317, Dec. 30, 1992, which is a continuation-in-part of PCT/US92/09615, Nov. 6, 1992, which is a continuation-in-part of PCT/US92/01686, Mar. 3, 1992.

[51] Int. Cl.$^6$ .............................................. A23G 3/30
[52] U.S. Cl. ........................................ 426/3; 426/4
[58] Field of Search .................................. 426/3–6, 426/548, 804

[56] References Cited

U.S. PATENT DOCUMENTS

| | | | |
|---|---|---|---|
| 1,534,929 | 4/1925 | Dunham | 426/5 |
| 1,534,930 | 4/1925 | Dunham | 426/5 |
| 1,534,931 | 4/1925 | Dunham | 426/5 |
| 1,807,704 | 6/1931 | Pappadis | 426/3 |
| 2,078,878 | 4/1937 | Jackman | 99/135 |
| 2,265,465 | 12/1941 | Wilson | 99/135 |
| 2,289,407 | 7/1942 | Hampton | 99/135 |
| 2,782,123 | 2/1957 | Rubin | 99/141 |
| 3,161,524 | 12/1964 | Opie et al. | 99/94 |
| 3,262,784 | 7/1966 | Bucher | 99/135 |
| 3,632,358 | 1/1972 | Echeandia et al. | 99/135 |
| 3,766,165 | 10/1973 | Rennhard | 260/209 R |
| 3,843,818 | 10/1974 | Wren et al. | 426/346 |
| 3,857,965 | 12/1974 | Ream | 426/3 |
| 3,894,146 | 7/1975 | Tsuyama | 424/49 |
| 3,974,032 | 8/1976 | Harjes et al. | 195/31 R |
| 3,984,574 | 10/1976 | Comollo | 426/4 |
| 3,995,064 | 11/1976 | Ehrgott et al. | 426/3 |
| 3,996,389 | 12/1976 | Osborne | 426/565 |
| 4,065,579 | 12/1977 | Mackay et al. | 426/3 |
| 4,139,639 | 2/1979 | Bahoshy et al. | 426/3 |
| 4,150,161 | 4/1979 | Rudolph et al. | 426/3 |
| 4,187,320 | 2/1980 | Koch et al. | 426/3 |
| 4,224,345 | 9/1980 | Tezuka et al. | 426/3 |
| 4,230,687 | 10/1980 | Sair et al. | 424/22 |
| 4,352,822 | 9/1981 | Cherukuri et al. | 426/4 |

(List continued on next page.)

FOREIGN PATENT DOCUMENTS 0067665 12/1982 European Pat. Off. ...... A23G 3/30

(List continued on next page.)

OTHER PUBLICATIONS

"Fructooligosaccharides (FOS)—An All Natural, Versatile, Low-Calorie Bulking Agent", by Dr. Peter Perna, Coors Biotech, Inc. (date unknown).

(List continued on next page.)

Primary Examiner—Jeanette Hunter
Attorney, Agent, or Firm—Maxwell J. Petersen; Willian Brinks Hofer Gilson & Lione

[57] ABSTRACT

A wax-free chewing gum is provided which uses a gum base which is devoid or substantially free of wax. The gum base includes about 20 to about 60 weight percent synthetic elastomer, 0 to about 30 weight percent natural elastomer, about 5 to about 55 weight percent elastomer plasticizer, about 4 to about 40 weight percent filler, about 5 to about 40 weight percent softener, and optional minor amounts of miscellaneous ingredients such as colors, antioxidants, etc. Wax-free chewing gum compositions which contain the wax-free gum base are also provided, which chewing gums further comprise flavoring agents and water-soluble bulk portions. The bulk portions contain controlled release sweeteners at least one of which provides a similar release profile to the release profile of at least one flavoring agent present in the chewing gums.

48 Claims, No Drawings

U.S. PATENT DOCUMENTS

| | | | |
|---|---|---|---|
| 4,352,823 | 10/1982 | Cherukuri et al. | 426/5 |
| 4,357,355 | 11/1982 | Koch et al. | 426/4 |
| 4,359,531 | 11/1982 | Bucke et al. | 435/97 |
| 4,382,963 | 5/1983 | Klose et al. | 426/3 |
| 4,384,004 | 5/1983 | Cea et al. | 426/3 |
| 4,386,106 | 5/1983 | Merritt et al. | 426/5 |
| 4,387,108 | 6/1983 | Koch et al. | 426/4 |
| 4,452,820 | 6/1984 | D'Amelia et al. | 426/3 |
| 4,497,846 | 2/1985 | Boursier et al. | 426/660 |
| 4,514,422 | 4/1985 | Yang et al. | 426/3 |
| 4,515,769 | 5/1985 | Merritt et al. | 424/49 |
| 4,528,206 | 7/1985 | Kastin | 426/660 |
| 4,556,429 | 12/1985 | Takazoe et al. | 127/30 |
| 4,579,738 | 4/1986 | Cherukuri et al. | 426/3 |
| 4,581,234 | 4/1986 | Cherukuri et al. | 426/3 |
| 4,587,119 | 5/1986 | Bucke et al. | 424/48 |
| 4,587,125 | 5/1986 | Cherukuri et al. | 424/48 |
| 4,597,970 | 7/1986 | Sharma et al. | 426/5 |
| 4,604,287 | 8/1986 | Glass et al. | 426/5 |
| 4,634,593 | 1/1987 | Stroz et al. | 426/5 |
| 4,671,961 | 6/1987 | Patel et al. | 426/3 |
| 4,671,967 | 6/1987 | Patel et al. | 426/658 |
| 4,681,771 | 7/1987 | Adachi et al. | 426/658 |
| 4,683,138 | 7/1987 | Glass et al. | 426/5 |
| 4,695,326 | 9/1987 | Takazoe et al. | 127/30 |
| 4,728,515 | 3/1988 | Patel et al. | 426/3 |
| 4,737,366 | 4/1988 | Gergely et al. | 426/5 |
| 4,741,905 | 5/1988 | Huzinec | 426/3 |
| 4,765,991 | 8/1988 | Cherukuri et al. | 426/3 |
| 4,786,722 | 11/1988 | Zehner | 536/1.1 |
| 4,792,453 | 12/1988 | Reed et al. | 426/5 |
| 4,794,003 | 12/1988 | Cherukuri et al. | 426/6 |
| 4,802,924 | 2/1989 | Woznicki et al. | 427/3 |
| 4,804,544 | 2/1989 | Cherukuri et al. | 426/5 |

(List continued on next page.)

FOREIGN PATENT DOCUMENTS

| | | | |
|---|---|---|---|
| 0082670 | 6/1983 | European Pat. Off. | A23G 3/30 |
| 0236271 | 9/1987 | European Pat. Off. | A61K 9/68 |
| 0252874 | 1/1988 | European Pat. Off. | A23G 3/30 |
| 0301628 | 2/1989 | European Pat. Off. | C12N 9/10 |
| 0325090 | 7/1989 | European Pat. Off. | A23G 3/30 |
| 0337889 | 10/1989 | European Pat. Off. | A23G 1/236 |
| 0351972 | 1/1990 | European Pat. Off. | A23G 3/30 |
| 0351973 | 1/1990 | European Pat. Off. | A23L 1/236 |
| 0368451 | 5/1990 | European Pat. Off. | C08B 30/18 |
| 0390438 | 10/1990 | European Pat. Off. | A23G 3/00 |
| 0397027 | 11/1990 | European Pat. Off. | A01N 43/08 |
| 0398465 | 11/1990 | European Pat. Off. | C08B 37/00 |
| 0421670 | 4/1991 | European Pat. Off. | A23G 3/30 |
| 0425115 | 5/1991 | European Pat. Off. | A23G 3/30 |
| 0438912 | 7/1991 | European Pat. Off. | A23L 1/308 |
| 0449594 | 10/1991 | European Pat. Off. | A23L 1/0526 |
| 0457098 | 11/1991 | European Pat. Off. | A23L 1/307 |
| 0472428 | 2/1992 | European Pat. Off. | A23G 3/30 |
| 0566174 | 10/1993 | European Pat. Off. | A23G 3/30 |
| 2626583 | 8/1989 | France | C12P 19/44 |
| 2115461 | 3/1971 | Germany | A23G 3/30 |
| 58-138355 | 8/1983 | Japan | A23L 1/236 |
| 60-224449 | 11/1985 | Japan | A23G 3/30 |
| 61-173748 | 6/1986 | Japan | A23G 3/30 |
| 62-146562 | 6/1987 | Japan | A23G 3/30 |
| 62-148496 | 7/1987 | Japan | C07H 15/4 |
| 1-19860 | 4/1989 | Japan | A23G 3/30 |
| 2-100695 | 4/1990 | Japan | C12P 19/14 |
| 2-154664 | 6/1990 | Japan | A23L 1/308 |
| 3-20301 | 1/1991 | Japan | C08B 37/00 |
| 3-47831 | 7/1991 | Japan | A23L 3/308 |
| 3-47832 | 7/1991 | Japan | A23L 1/308 |
| 347376 | 4/1931 | United Kingdom . | |
| 378073 | 8/1932 | United Kingdom | A23G 3/30 |
| 2063268 | 11/1979 | United Kingdom | C13K 13/00 |
| 2066639 | 11/1979 | United Kingdom | A23L 1/236 |
| 84-01693 | 5/1984 | WIPO | A23G 3/30 |
| 89-03170 | 4/1989 | WIPO . | |
| 90-06061 | 6/1990 | WIPO | A23G 3/30 |
| 90-06317 | 6/1990 | WIPO | C07H 15/04 |
| 90-07859 | 7/1990 | WIPO . | |
| 90-07864 | 7/1990 | WIPO . | |
| 91-03147 | 3/1991 | WIPO . | |
| 92-10943 | 7/1992 | WIPO | A23G 3/30 |

OTHER PUBLICATIONS

"Polymer Handbook", Second Edition, by Bandrup & Immergut, John Wiley & Sons, Inc. (1975), pp. IV-337 to IV-375.

Raftilose, "Oligofructose", by Raffinerie Tirlemontoise S.A. and Tiense Suikerraffinaderij N.V.

"Soluble & Insoluble Bulking Agents, Prospects & Applications", by Smits and Norman, presented at IBC Bulking Agents Conference (Mar. 13, 1991).

"Textbook Of Polymer Science", Second Edition, by Billmeyer, Jr., John Wiley & Sons, Inc. (1971), pp. 23–61.

L. A. Dreyfus Company-List Of Known Gum Base Compositions, 7 pp., Aug. 25, 1994.

U.S. PATENT DOCUMENTS

| Number | Date | Inventor | Class |
|---|---|---|---|
| 4,816,265 | 3/1989 | Cherukuri et al. | 426/5 |
| 4,872,884 | 10/1989 | Cherukuri et al. | 426/3 |
| 4,889,727 | 12/1989 | Dave et al. | 426/3 |
| 4,931,294 | 6/1990 | Yatka et al. | 426/3 |
| 4,933,188 | 6/1990 | Cherukuri et al. | 426/3 |
| 4,938,971 | 7/1990 | Chapdelaine et al. | 426/3 |
| 4,948,596 | 8/1990 | Bunick et al. | 426/3 |
| 4,954,353 | 9/1990 | Cherukuri et al. | 426/5 |
| 4,961,935 | 10/1990 | Cherukuri et al. | 426/3 |
| 4,971,787 | 11/1990 | Cherukuri et al. | 414/48 |
| 4,971,806 | 11/1990 | Cherukuri et al. | 426/5 |
| 4,975,287 | 12/1990 | Zibell et al. | 426/3 |
| 4,978,751 | 12/1990 | Biton et al. | 536/123 |
| 4,980,177 | 12/1990 | Cherukuri et al. | 426/3 |
| 4,983,405 | 1/1991 | Cherukuri et al. | 426/3 |
| 4,986,991 | 1/1991 | Yatka et al. | 426/3 |
| 5,009,900 | 4/1991 | Levine et al. | 426/96 |
| 5,023,093 | 6/1991 | Cherukuri et al. | 426/3 |
| 5,039,530 | 8/1991 | Yatka et al. | 426/3 |
| 5,041,294 | 8/1991 | Patel | 426/3 |
| 5,059,429 | 10/1991 | Cherukuri et al. | 426/3 |
| 5,066,511 | 11/1991 | Cherukuri et al. | 426/658 |
| 5,082,671 | 1/1992 | Cherukuri | 426/3 |
| 5,085,872 | 2/1992 | Patel et al. | 426/4 |
| 5,087,459 | 2/1992 | Chuu et al. | 426/4 |
| 5,100,678 | 3/1992 | Reed et al. | 426/3 |
| 5,120,550 | 6/1992 | Van der Schueren | 426/3 |
| 5,139,798 | 8/1992 | Yatka et al. | 426/5 |
| 5,165,943 | 11/1992 | Patel et al. | 426/3 |
| 5,165,944 | 11/1992 | Song et al. | 426/5 |
| 5,167,972 | 12/1992 | Greenberg et al. | 426/3 |
| 5,169,657 | 12/1992 | Yatka et al. | 426/5 |
| 5,169,658 | 12/1992 | Yatka et al. | 426/5 |
| 5,171,589 | 12/1992 | Richey et al. | 426/5 |
| 5,178,889 | 1/1993 | Reed et al. | 426/3 |
| 5,192,562 | 3/1993 | Grey et al. | 426/4 |
| 5,286,500 | 2/1994 | Synosky et al. | 426/3 |
| 5,286,501 | 2/1994 | Song et al. | 426/3 |
| 5,336,509 | 8/1994 | McGrew | 426/3 |
| 5,342,631 | 8/1994 | Yatka et al. | 426/3 |

WAX-FREE CHEWING GUMS WITH CONTROLLED SWEETENER RELEASE

RELATED APPLICATIONS

This application is a continuation-in-part of copending International Application No. PCT/US92/11317, (Case No. 1391/1289), filed on Dec. 30, 1992, which in turn is a continuation-in-part of International Application No. PCT/US92/09615, filed on Nov. 6, 1992, which in turn is a continuation-in-part of PCT/US92/01686, filed on Mar. 3, 1992.

FIELD OF THE INVENTION

The present invention relates to an improved wax-free chewing gum and particularly to wax-free chewing gum products containing controlled release sweeteners.

BACKGROUND OF THE INVENTION

U.S. Pat. No. 3,984,574, issued to Comollo, discloses an abhesive chewing gum base in which the non-tack properties were achieved by eliminating conventional chewing gum base ingredients which were found to contribute to chewing gum tackiness, and by substituting non-tacky ingredients in place of the conventional ingredients. Specifically, it was discovered that three classes of materials account for conventional chewing gum tackiness. These materials are elastomers, resins, and waxes.

Comollo eliminated natural and some synthetic elastomers from chewing gum base, and substituted in their place one or more non-tacky synthetic elastomers such as polyisobutylene, polyisoprene, isobutyleneisoprene copolymer and butadiene-styrene copolymer. Comollo also eliminated the tack-producing natural resins and modified natural resins and used instead relatively high amounts of hydrogenated or partially hydrogenated vegetable oils or animal fats. Finally, Comollo completely excluded waxes from the gum base, but included polyvinyl acetate, fatty acids, and mono and diglycerides of fatty acids. Comollo did not teach controlled release of sweeteners with his abhesive chewing gums.

SUMMARY OF THE INVENTION

The present invention is directed to a wax-free chewing gum containing controlled release sweeteners. The chewing gum of the invention includes a wax-free chewing gum base comprising quantities of synthetic elastomer, elastomer plasticizer, filler and softener, and, like the gum base of Comollo, is substantially free of wax. However, the gum base of the invention is not limited to use in a non-tack chewing gum and may, therefore, contain optional quantities of natural elastomer and/or natural resins. The gum base of the invention may also contain optional quantities of minor ingredients such as color and antioxidant.

The use of natural elastomers in the gum base compliments certain chewing gum flavors, such as mint oil, by rounding out the otherwise harsh or grassy notes in the flavor. The presence of natural elastomers and natural resins in the gum base also contributes to improved chewing gum texture and flavor retention. There is currently a need or desire in the chewing gum industry for gum bases which are devoid or substantially free of hydrocarbon-containing waxes and which contain desired quantities of natural elastomers, natural resins, or both.

When the wax-free gum bases are formulated with water-soluble ingredients, such as, for example, sweeteners, bulking agents, binders, and the like, and flavoring agents, it has been determined that the wax-free gum bases, when formulated into chewing gums, surprisingly produce chewing gums which tend to release certain flavoring ingredients at accelerated rates. Also, it's been observed that a greater overall quantity of flavor is released from wax-free gums. This results not only in a stronger initial flavor impact, but also in a stronger flavor in later stages of chewing. This is taught in U.S. patent application 07/997,732, filed Dec. 30, 1992 (Case No. 1391/1282), which is incorporated herein by reference. To obtain a balanced release of flavor and sweeteners, which balance enhances the consumer's pleasure, it is now important in the wax-free chewing gums of this invention to formulate the wax-free chewing gum with not only the wax-free gum bases of the invention, but also to formulate the chewing gums using flavors and sweeteners which release essentially concurrently. This requires a controlled sweetener release that provides rapid release to compliment the more rapid release of flavors in wax-free chewing gums, but also provides controlled, and longer term sweetener release, concurrently with stronger flavor release in later stages of the chew, thereby providing consumer pleasure over the life of the chew.

With the foregoing in mind, it is a feature and advantage of the invention to provide a substantially wax-free chewing gum base.

It is also a feature and advantage of the invention to provide a suitably soft gum base in which wax is not needed to soften the gum base.

It is also a feature and advantage of the invention to provide improved chewing gums which contain the wax-free chewing gum base of the invention, which gums contain controlled release sweeteners.

It is also a feature and advantage of the invention to provide improved chewing gums made from said inventive wax-free gum base which does not retain the amount of flavor typical sugarless gums retain after chewing, and in fact releases flavoring ingredients at a rate greater than observed with a wax containing chewing gum, and to provide sweetener release at comparable rates to flavor release from these wax-free chewing gums, both initially and throughout the chew.

It is also a feature and advantage of the invention to provide chewing gum products having desirable properties such as flavor quality and strength, flavor and sweetness retention, sweetness and flavor release profiles which are comparable, or at least similar to one another, controlled rate of both flavor and sweetness release, controlled sweetness release at rates at least comparable to flavor release in the wax-free chewing gums of this invention, as well as breath freshening, dental and oral health properties and good shelf stability.

The foregoing and other features and advantages will become further apparent from the following detailed description of the presently preferred embodiments, when read in conjunction with the accompanying examples. It should be understood that the detailed description and examples are illustrative rather than limitative, the scope of the present invention being defined by the appended claims and equivalents thereof.

DETAILED DESCRIPTION OF THE PRESENTLY PREFERRED EMBODIMENTS

In accordance with the invention, a chewing gum base is provided for use in either non-tack or conventional chewing gum, which may be either bubble gum or regular chewing gum. The chewing gum base of the invention contains about 20 to about 60 weight percent synthetic elastomer, 0 to about 30 weight percent natural elastomer, about 5 to about 55 weight percent elastomer plasticizer, about 4 to about 35 weight percent filler, about 5 to about 35 weight percent softener, and optional minor amounts (about one percent or less) of miscellaneous ingredients such as colorants, antioxidants, etc.

Synthetic elastomers may include, but are not limited to, polyisobutylene with GPC molecular weight of about 10,000 to about 95,000, isobutylene-isoprene copolymer (butyl elastomer), styrene-butadiene copolymers having styrene-butadiene ratios of about 1:3 to about 3:1, polyvinyl acetate having GPC molecular weight of about 2,000 to about 90,000, polyisoprene, polyethylene, vinyl acetate-vinyl laurate copolymer having vinyl laurate content of about 5 to about 50 percent by weight of the copolymer, and combinations thereof. Preferred combinations include, but are not limited to polyisobutylene and styrene-butadiene, polyisobutylene and polyisoprene, polyisobutylene and isobutylene-isoprene copolymer (butyl rubber), polyisobutylene, styrene-butadiene copolymer, and isobutylene-isoprene copolymer, and all of the above in admixture with polyvinyl acetate, vinyl acetate-vinyl laurate copolymers and mixtures thereof.

Preferred ranges are, for polyisobutylene, 50,000 to 80,000 GPC molecular weight, for styrene-butadiene, 1:1 to 1:3 bound styrene-butadiene, for polyvinyl acetate, 10,000 to 65,000 GPC molecular weight with the higher molecular weight polyvinyl acetates typically used in bubble gum base, and for vinyl acetate-vinyl laurate, vinyl laurate content of 10–45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, chiquibul, crown gum, pendare, venezuelau chicle, leche de vaca, niger gutta, tunu, chilte and combinations thereof. The preferred natural elastomers are jelutong, chicle, sorva and massaranduba balata. The preferred elastomers and elastomer concentrations vary depending on whether the chewing gum in which the base is used is adhesive or conventional, bubble gum or regular gum, as discussed below.

Elastomer plasticizers may include, but are not limited to, natural rosin esters such as glycerol esters of partially hydrogenated rosin, glycerol esters of polymerized rosin, glycerol esters of partially dimerized rosin, glycerol esters of rosin, glycerol ester of tall oil rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; natural terpene resin; and any suitable combinations of the foregoing. The preferred elastomer plasticizers will also vary depending on the specific application, and on the type of elastomer which is used. For example, use of terpene resin to wholly or partially replace ester gums will cause the gum base to be less tacky.

The term "wax-free" as used herein refers to the exclusion of waxes which contain mineral hydrocarbons. Natural waxes such as carnauba wax, beeswax, rice bran wax, and candellila wax do not contain mineral hydrocarbons and are therefor acceptable for use in the chewing gum base and chewing gums prepared therefrom. However, our gum bases preferably contain from 0–5 weight percent natural wax, and most preferably are free of both mineral hydrocarbon waxes, i.e. petroleum waxes, and natural waxes.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di-and triglycerides, acetylated monoglycerides, fatty acids (e.g. stearic, palmitic, oleic and linoleic acids), lanolin, diacetin, and combinations thereof. Hydrogenated vegetable oils are generally preferred, either alone or in combination with other softeners.

Colorants and whiteners may include FD&C-type dyes and lakes, fruit and vegetable extracts, titanium dioxide, cocoa powder and combinations thereof.

The wax-free gum base of the invention may also contain optional ingredients such as either natural or synthetic antioxidants.

When the wax-free gum base of the invention is to be used in a regular (non-bubble) gum which has at least some abhesive (reduced tack) characteristics, the base should contain about 10 to about 40 weight percent synthetic elastomer, about 15 to about 30 weight percent elastomer plasticizer, about 5 to about 30 weight percent filler, about 15 to about 35 weight percent softener, 0 to about 1 weight percent colorant and 0 to about 0.1 weight percent antioxidant. Specific embodiments of the wax-free gum base are provided in Examples 1–30 below.

TABLE 1

Wax-Free Gum Bases For Use In Chewing Gum Having Some Reduced Tack Characteristics (Examples 1–30)

| EXAMPLES 1–5 | | | | | |
|---|---|---|---|---|---|
| IDENTIFICATION - EXAMPLE #: GENERIC INGREDIENTS | 1 | 2 | 3 | 4 | 5 |
| ** SYNTHETIC ELASTOMER ** | | | | | |
| STYRENE-BUTADIENE ELASTOMER | 5.3 | — | 2.1 | 1.3 | 1.8 |
| BUTYL (ISOPRENE-ISOBUTYLENE) ELASTOMER | 8.6 | 7.9 | 7.2 | 14.8 | — |
| POLYISOBUTYLENE ELASTOMER | 7.1 | — | 7.4 | 5.2 | 24.8 |

TABLE 1-continued

Wax-Free Gum Bases For Use In Chewing Gum Having Some Reduced Tack Characteristics (Examples 1–30)

| GENERIC INGREDIENTS | | | | | |
|---|---|---|---|---|---|
| POLYVINYL ACETATE | 10.5 | 27.2 | 15.3 | 12.1 | 10.1 |
| ** ELASTOMER PLASTICIZERS ** | | | | | |
| GLYCEROL ESTERS OF ROSIN | 2.1 | — | 19.0 | — | 3.7 |
| GLYCEROL ESTERS OF PART HYD ROSIN | 4.3 | 18.2 | — | 15.3 | 7.9 |
| TERPENE RESINS | 10.8 | — | — | — | 7.1 |
| ** FILLER ** | | | | | |
| CALCIUM CARBONATE | — | 15.9 | 20.7 | — | 17.7 |
| TALC | 25.5 | — | — | 16.7 | — |
| ** SOFTENER ** | | | | | |
| HYDROGENATED VEGETABLE OIL | 15.3 | 22.6 | 24.3 | 28.4 | 21.0 |
| GLYCEROL MONOSTEARATE | 8.2 | 7.4 | 4.0 | 5.1 | 3.5 |
| LECITHIN | 2.3 | 0.8 | — | 1.1 | 2.4 |
| TOTAL PERCENT | 100.0 | 100.0 | 100.0 | 100.0 | 100.0 |

EXAMPLES 6–10

| IDENTIFICATION - EXAMPLE #: GENERIC INGREDIENTS | 6 | 7 | 8 | 9 | 10 |
|---|---|---|---|---|---|
| ** SYNTHETIC ELASTOMER ** | | | | | |
| STYRENE-BUTADIENE ELASTOMER | — | — | — | 5.2 | 2.1 |
| BUTYL (ISOPRENE-ISOBUTYLENE) ELASTOMER | 8.1 | 14.6 | 9.4 | 4.1 | 7.2 |
| POLYISOBUTYLENE ELASTOMER | 3.6 | 1.2 | 13.0 | 5.9 | 7.3 |
| POLYVINYL ACETATE | 27.5 | 26.2 | 22.3 | 25.7 | 15.3 |
| ** ELASTOMER PLASTICIZERS ** | | | | | |
| GLYCEROL ESTERS OF ROSIN | — | 4.9 | — | 23.5 | 19.1 |
| GLYCEROL ESTERS OF PART HYD ROSIN | — | 12.6 | — | — | — |
| TERPENE RESINS | 27.1 | — | 10.0 | 3.2 | — |
| ** FILLER ** | | | | | |
| CALCIUM CARBONATE | 10.9 | — | 20.0 | 15.1 | 20.7 |
| TALC | — | 13.1 | — | — | — |
| ** SOFTENER ** | | | | | |
| HYDROGENATED VEGETABLE OIL | 14.3 | 16.6 | 20.7 | 12.2 | 24.3 |
| GLYCEROL MONOSTEARATE | 4.8 | 9.6 | 4.6 | 5.1 | 4.0 |
| LECITHIN | 3.7 | 1.2 | — | — | — |
| TOTAL PERCENT | 100.0 | 100.0 | 100.0 | 100.00 | 100.0 |

EXAMPLES 11–15

| IDENTIFICATION - EXAMPLE #: GENERIC INGREDIENTS | 11 | 12 | 13 | 14 | 15 |
|---|---|---|---|---|---|
| ** SYNTHETIC ELASTOMER ** | | | | | |
| STYRENE-BUTADIENE ELASTOMER | 4.3 | 5.9 | 3.9 | — | 2.1 |
| BUTYL (ISOPRENE-ISOBUTYLENE) ELASTOMER | 6.2 | 6.9 | 5.3 | 9.3 | 6.0 |
| POLYISOBUTYLENE ELASTOMER | 6.4 | 2.0 | 12.7 | 12.1 | 8.5 |
| POLYVINYL ACETATE | 21.8 | 24.8 | 14.9 | 21.4 | 15.3 |
| ** ELASTOMER PLASTICIZERS ** | | | | | |
| GLYCEROL ESTERS OF ROSIN | 2.6 | 8.6 | — | — | 10.1 |
| GLYCEROL ESTERS OF PART HYD ROSIN | — | 8.0 | — | — | 8.9 |
| TERPENE RESINS | 17.1 | 1.9 | 21.4 | 6.5 | — |
| ** FILLER ** | | | | | |
| CALCIUM CARBONATE | — | 9.9 | 13.7 | 21.4 | 20.9 |
| TALC | 14.6 | 7.2 | 1.4 | — | — |
| ** SOFTENER ** | | | | | |
| HYDROGENATED VEGETABLE OIL | 19.5 | 21.1 | 18.7 | 25.2 | 24.2 |
| GLYCEROL MONOSTEARATE | 4.4 | 3.7 | 5.7 | 4.1 | 4.0 |
| LECITHIN | 3.1 | — | 2.3 | — | — |
| TOTAL PERCENT | 100.0 | 100.0 | 100.0 | 100.0 | 100.0 |

EXAMPLES 16–20

| IDENTIFICATION - EXAMPLE #: GENERIC INGREDIENTS | 16 | 17 | 18 | 19 | 20 |
|---|---|---|---|---|---|
| ** SYNTHETIC ELASTOMER ** | | | | | |
| STYRENE-BUTADIENE ELASTOMER | 1.6 | — | 2.7 | — | — |
| BUTYL (ISOPRENE-ISOBUTYLENE) ELASTOMER | 3.7 | 8.1 | 2.3 | 8.9 | 3.6 |
| POLYISOBUTYLENE ELASTOMER | 6.8 | 3.6 | 14.2 | 10.0 | 11.1 |

TABLE 1-continued
Wax-Free Gum Bases For Use In Chewing Gum Having Some Reduced Tack Characteristics (Examples 1-30)

| | | | | | |
|---|---|---|---|---|---|
| POLYVINYL ACETATE | 22.3 | 27.3 | 17.3 | 21.3 | 21.9 |
| ELASTOMER PLASTICIZERS | | | | | |
| GLYCEROL ESTERS OF ROSIN | 9.9 | — | — | — | 19.6 |
| GLYCEROL ESTERS OF PART HYD ROSIN | 4.3 | — | 27.3 | — | 11.2 |
| TERPENE RESINS | 11.6 | 26.9 | — | 9.7 | 3.7 |
| FILLER | | | | | |
| CALCIUM CARBONATE | — | 11.3 | — | 21.5 | 6.4 |
| TALC | 17.2 | — | 8.2 | — | — |
| SOFTENER | | | | | |
| HYDROGENATED VEGETABLE OIL | 17.8 | 14.3 | 22.4 | 23.2 | 19.2 |
| GLYCEROL MONOSTEARATE | 4.8 | 4.8 | 2.7 | 5.4 | 3.3 |
| LECITHIN | — | 3.7 | 2.9 | — | — |
| TOTAL PERCENT | 100.0 | 100.0 | 100.0 | 100.0 | 100.0 |

EXAMPLES 21-25

| IDENTIFICATION - EXAMPLE #: GENERIC INGREDIENTS | 21 | 22 | 23 | 24 | 25 |
|---|---|---|---|---|---|
| SYNTHETIC ELASTOMER | | | | | |
| STYRENE-BUTADIENE ELASTOMER | — | 1.4 | 3.2 | — | 4.1 |
| BUTYL (ISOPRENE-ISOBUTYLENE) ELASTOMER | 7.4 | 8.4 | 7.3 | 8.8 | 11.3 |
| POLYISOBUTYLENE ELASTOMER | 1.9 | 1.6 | 7.5 | 3.5 | 7.9 |
| POLYVINYL ACETATE | 24.8 | 23.1 | 21.1 | 27.9 | 18.2 |
| ELASTOMER PLASTICIZERS | | | | | |
| GLYCEROL ESTERS OF ROSIN | — | 13.1 | 15.3 | — | — |
| GLYCEROL ESTERS OF PART HYD ROSIN | — | 22.1 | 2.4 | — | 26.2 |
| TERPENE RESINS | 25.8 | 3.6 | 5.8 | 27.4 | 1.4 |
| FILLER | | | | | |
| CALCIUM CARBONATE | 18.6 | — | — | 11.9 | 13.6 |
| TALC | — | 7.3 | 14.8 | — | — |
| SOFTENER | | | | | |
| HYDROGENATED VEGETABLE OIL | 12.3 | 11.3 | 19.8 | 12.3 | 8.2 |
| GLYCEROL MONOSTEARATE | 4.4 | 4.4 | 2.8 | 4.7 | 5.2 |
| LECITHIN | 4.8 | 3.7 | — | 3.5 | 3.9 |
| TOTAL PERCENT | 100.0 | 100.0 | 100.0 | 100.0 | 100.0 |

EXAMPLES 26-30

| IDENTIFICATION - EXAMPLE #: GENERIC INGREDIENTS | 26 | 27 | 28 | 29 | 30 |
|---|---|---|---|---|---|
| SYNTHETIC ELASTOMER | | | | | |
| STYRENE-BUTADIENE ELASTOMER | — | — | — | — | — |
| BUTYL (ISOPRENE-ISOBUTYLENE) ELASTOMER | 10.0 | 9.2 | 2.4 | 8.3 | 8.8 |
| POLYISOBUTYLENE ELASTOMER | 1.9 | 6.3 | 8.4 | 3.6 | 2.3 |
| POLYVINYL ACETATE | 27.6 | 13.1 | 20.5 | 27.5 | 27.4 |
| ELASTOMER PLASTICIZERS | | | | | |
| GLYCEROL ESTERS OF ROSIN | — | — | — | — | — |
| GLYCEROL ESTERS OF PART HYD ROSIN | — | 19.9 | — | — | — |
| TERPENE RESINS | 25.3 | — | 23.5 | 25.3 | 28.3 |
| FILLER | | | | | |
| CALCIUM CARBONATE | 11.3 | 22.3 | — | 11.3 | 12.5 |
| TALC | — | — | 15.6 | — | — |
| SOFTENER | | | | | |
| HYDROGENATED VEGETABLE OIL | 15.4 | 18.6 | 19.2 | 16.5 | 12.5 |
| GLYCEROL MONOSTEARATE | 4.8 | 10.6 | 8.9 | 4.8 | 4.7 |
| LECITHIN | 3.7 | — | 1.5 | 2.7 | 3.5 |
| TOTAL PERCENT | 100.0 | 100.0 | 100.0 | 100.0 | 100.0 |

When the wax-free gum base of the invention is to be used in a regular (non-bubble) gum which does not have abhesive characteristics, the base should contain about 12 to about 30 weight percent natural elastomer, about 20 to about 40 weight percent synthetic elastomer, about 4 to about 25 weight percent elastomer plasticizer, about 5 to about 25 weight percent filler, about 15 to about 30 weight percent softener, 0 to about 1 weight percent colorant and 0 to about 0.1 weight percent antioxidant. Specific embodiments of the wax-free gum base fitting this description are provided in Examples 31-55 below:

TABLE 2

Wax-Free Gum Bases For Use
In Chewing Gum Not Having Reduced Tack (Examples 31–55)

EXAMPLES 31–34

| IDENTIFICATION - EXAMPLE #: GENERIC INGREDIENTS | 31 | 32 | 33 | 34 |
|---|---|---|---|---|
| ** NATURAL ELASTOMER ** | | | | |
| NATURAL GUM | 22.0 | 26.5 | 23.4 | 25.1 |
| ** SYNTHETIC ELASTOMER ** | | | | |
| STYRENE-BUTADIENE ELASTOMER | — | — | — | 1.9 |
| BUTYL (ISOPRENE-ISOBUTYLENE) ELASTOMER | 4.8 | 7.1 | 5.6 | 2.1 |
| POLYISOBUTYLENE ELASTOMER | 5.7 | 5.6 | 3.0 | 4.7 |
| POLYVINYL ACETATE | 16.4 | 18.7 | 19.8 | 24.8 |
| ** ELASTOMER PLASTICIZERS ** | | | | |
| GLYCEROL ESTERS OF ROSIN | 3.8 | — | — | 3.2 |
| GLYCEROL ESTERS OF PART HYD ROSIN | 12.3 | 15.3 | 15.9 | 12.6 |
| METHYL ESTERS OF ROSIN | — | — | — | 2.1 |
| TERPENE RESINS | — | — | — | — |
| ** FILLER ** | | | | |
| CALCIUM CARBONATE | — | 4.0 | 10.7 | 4.4 |
| TALC | 7.1 | — | — | — |
| ** SOFTENER ** | | | | |
| HYDROGENATED VEGETABLE OIL | 21.8 | 18.4 | 16.8 | 12.6 |
| GLYCEROL MONOSTEARATE | 6.1 | 4.4 | 4.8 | 3.8 |
| LECITHIN | — | — | — | 2.7 |
| TOTAL PERCENT | 100.0 | 100.0 | 100.0 | 100.0 |

EXAMPLES 35–38

| IDENTIFICATION - EXAMPLE #: GENERIC INGREDIENTS | 35 | 36 | 37 | 38 |
|---|---|---|---|---|
| ** NATURAL ELASTOMER ** | | | | |
| NATIONAL GUM | 22.8 | 18.2 | 23.5 | 17.6 |
| ** SYNTHETIC ELASTOMER ** | | | | |
| STYRENE-BUTADIENE ELASTOMER | 2.6 | — | | |
| BUTYL (ISOPRENE-ISOBUTYLENE) ELASTOMER | 4.1 | 6.9 | 8.8 | 10.2 |
| POLYISOBUTYLENE ELASTOMER | 3.2 | 5.4 | 3.3 | 2.1 |
| POLYVINYL ACETATE | 16.3 | 15.2 | 12.9 | 26.9 |
| ** ELASTOMER PLASTICIZERS ** | | | | |
| GLYCEROL ESTERS OF ROSIN | 6.9 | — | 8.5 | 11.7 |
| GLYCEROL ESTERS OF PART HYD ROSIN | 11.8 | 12.5 | 5.5 | 4.8 |
| METHYL ESTERS OF ROSIN | 1.7 | 2.6 | 1.4 | — |
| TERPENE RESINS | — | — | 3.7 | — |
| ** FILLER ** | | | | |
| CALCIUM CARBONATE | 9.3 | 16.0 | — | — |
| TALC | — | — | 9.3 | 4.6 |
| ** SOFTENER ** | | | | |
| HYDROGENATED VEGETABLE OIL | 18.2 | 16.1 | 16.2 | 15.8 |
| GLYCEROL MONOSTEARATE | — | 7.1 | 5.7 | 6.3 |
| LECITHIN | 3.1 | — | 1.2 | — |
| TOTAL PERCENT | 100.0 | 100.0 | 100.0 | 100.0 |

EXAMPLES 39–42

| IDENTIFICATION - EXAMPLE #: GENERIC INGREDIENTS | 39 | 40 | 41 | 42 |
|---|---|---|---|---|
| ** NATURAL ELASTOMER ** | | | | |
| NATURAL GUM | 12.9 | 18.5 | 15.7 | 22.6 |
| ** SYNTHETIC ELASTOMER ** | | | | |
| STYRENE-BUTADIENE ELASTOMER | — | — | 1.9 | — |
| BUTYL (ISOPRENE-ISOBUTYLENE) ELASTOMER | 9.1 | 6.4 | 3.7 | 5.8 |
| POLYISOBUTYLENE ELASTOMER | 9.4 | 5.2 | 4.1 | 3.1 |
| POLYVINYL ACETATE | 10.7 | 15.4 | 26.2 | 20.4 |
| ** ELASTOMER PLASTICIZERS ** | | | | |
| GLYCEROL ESTERS OF ROSIN | 15.2 | — | — | — |
| GLYCEROL ESTERS OF PART HYD ROSIN | — | 13.2 | 15.3 | 11.7 |
| METHYL ESTERS OF ROSIN | — | 2.0 | — | 4.0 |
| TERPENE RESINS | — | — | — | — |
| ** FILLER ** | | | | |
| CALCIUM CARBONATE | 20.6 | 18.5 | 12.2 | 11.6 |
| TALC | — | — | — | — |
| ** SOFTENER ** | | | | |
| HYDROGENATED VEGETABLE OIL | 15.8 | 13.9 | 15.1 | 17.5 |

TABLE 2-continued

Wax-Free Gum Bases For Use
In Chewing Gum Not Having Reduced Tack (Examples 31-55)

| | | | | |
|---|---|---|---|---|
| GLYCEROL MONOSTEARATE | 6.3 | 6.9 | 5.8 | 3.3 |
| LECITHIN | — | — | — | — |
| TOTAL PERCENT | 100.0 | 100.0 | 100.0 | 100.0 |

EXAMPLES 43-46

| IDENTIFICATION - EXAMPLE #: GENERIC INGREDIENTS | 43 | 44 | 45 | 46 |
|---|---|---|---|---|
| ** NATURAL ELASTOMER ** | | | | |
| NATURAL GUM | 23.7 | 22.1 | 21.1 | 22.2 |
| ** SYNTHETIC ELASTOMER ** | | | | |
| STYRENE-BUTADIENE ELASTOMER | — | — | — | — |
| BUTYL (ISOPRENE-ISOBUTYLENE) ELASTOMER | 6.2 | 5.7 | 6.1 | 5.7 |
| POLYISOBUTYLENE ELASTOMER | 5.9 | 3.1 | 2.8 | 3.1 |
| POLYVINYL ACETATE | 23.7 | 22.0 | 18.0 | 22.0 |
| ** ELASTOMER PLASTICIZERS ** | | | | |
| GLYCEROL ESTERS OF ROSIN | — | — | 15.7 | — |
| GLYCEROL ESTERS OF PART HYD ROSIN | 11.3 | 15.2 | — | 13.2 |
| METHYL ESTERS OF ROSIN | 2.9 | — | — | 2.0 |
| TERPENE RESINS | 2.8 | — | — | — |
| ** FILLER ** | | | | |
| CALCIUM CARBONATE | 5.6 | 11.4 | — | 11.3 |
| TALC | — | — | 15.4 | — |
| ** SOFTENER ** | | | | |
| HYDROGENATED VEGETABLE OIL | 12.1 | 17.2 | 15.1 | 17.2 |
| GLYCEROL MONOSTEARATE | 5.8 | 3.3 | 5.8 | 3.3 |
| LECITHIN | — | — | — | — |
| TOTAL PERCENT | 100.0 | 100.0 | 100.0 | 100.0 |

EXAMPLES 47-50

| IDENTIFICATION - EXAMPLE #: GENERIC INGREDIENTS | 47 | 48 | 49 | 50 |
|---|---|---|---|---|
| ** NATURAL ELASTOMER ** | | | | |
| NATURAL GUM | 23.8 | 28.4 | 18.7 | 19.5 |
| ** SYNTHETIC ELASTOMER ** | | | | |
| STYRENE-BUTADIENE ELASTOMER | — | — | — | |
| BUTYL (ISOPRENE-ISOBUTYLENE) ELASTOMER | 3.1 | 5.4 | 6.9 | 8.2 |
| POLYISOBUTYLENE ELASTOMER | 7.7 | 3.1 | 5.5 | 2.7 |
| POLYVINYL ACETATE | 20.5 | 26.6 | 14.8 | 17.2 |
| ** ELASTOMER PLASTICIZERS ** | | | | |
| GLYCEROL ESTERS OF ROSIN | — | — | — | 20.0 |
| GLYCEROL ESTERS OF PART HYD ROSIN | 10.4 | 11.4 | 15.5 | — |
| METHYL ESTERS OF ROSIN | 2.0 | — | — | — |
| TERPENE RESINS | 5.1 | — | — | — |
| ** FILLER ** | | | | |
| CALCIUM CARBONATE | — | 9.1 | 17.9 | 9.6 |
| TALC | 5.3 | — | — | — |
| ** SOFTENER ** | | | | |
| HYDROGENATED VEGETABLE OIL | 15.8 | 16.0 | 13.0 | 22.8 |
| GLYCEROL MONOSTEARATE | 6.3 | — | 7.7 | — |
| LECITHIN | — | — | — | — |
| TOTAL PERCENT | 100.0 | 100.0 | 100.0 | 100.0 |

EXAMPLES 51-55

| IDENTIFICATION - EXAMPLE #: GENERIC INGREDIENTS | 51 | 52 | 53 | 54 | 55 |
|---|---|---|---|---|---|
| ** NATURAL ELASTOMER ** | | | | | |
| NATURAL GUM | 14.4 | 18.2 | 25.2 | 25.2 | 26.7 |
| ** SYNTHETIC ELASTOMER ** | | | | | |
| STYRENE-BUTADIENE ELASTOMER | — | — | — | — | — |
| BUTYL (ISOPRENE-BUTYLENE) ELASTOMER | 9.1 | 6.8 | 2.4 | 3.5 | 3.2 |
| POLYISOBUTYLENE ELASTOMER | 3.6 | 5.4 | 4.9 | 5.7 | 6.1 |
| POLYVINYL ACETATE | 18.1 | 15.5 | 19.9 | 19.1 | 17.6 |
| ** ELASTOMER PLASTICIZERS ** | | | | | |
| GLYCEROL ESTERS OF ROSIN | 11.9 | — | 15.6 | — | — |
| GLYCEROL ESTERS OF PART HYD ROSIN | 13.0 | 12.7 | — | 15.6 | 15.6 |
| METHYL ESTERS OF ROSIN | — | 2.6 | — | — | — |
| TERPENE RESINS | — | — | 2.1 | 1.9 | — |
| ** FILLER ** | | | | | |
| CALCIUM CARBONATE | 14.1 | 15.7 | — | — | — |

TABLE 2-continued

Wax-Free Gum Bases For Use
In Chewing Gum Not Having Reduced Tack (Examples 31–55)

| | | | | | |
|---|---|---|---|---|---|
| TALC | — | — | 7.1 | 6.2 | 8.0 |
| **  SOFTENER  ** | | | | | |
| HYDROGENATED VEGETABLE OIL | 15.8 | 16.0 | 18.4 | 18.4 | 18.4 |
| GLYCEROL MONOSTEARATE | — | 7.1 | 4.4 | 4.4 | 2.8 |
| LECITHIN | — | — | — | — | 1.6 |
| TOTAL PERCENT | 100.0 | 100.0 | 100.0 | 100.0 | 100.0 |

When the wax-free gum base of the invention is to be used in a bubble gum, the base should contain about 30 to about 60 weight percent synthetic elastomer, about 5 to about 55 weight percent elastomer plasticizer, about 10 to about 35 weight percent filler, about 5 to about 25 weight percent softener, 0 to about 1 weight percent colorant and 0 to about 0.1 weight percent antioxidant. Specific embodiments of the wax-free base for use in bubble gum are provided in Examples 56–74 below.

TABLE 3

Wax-Free Gum Bases For Use In Bubble Gum

EXAMPLES 56–60

| IDENTIFICATION - EXAMPLE #: GENERIC INGREDIENTS | 56 | 57 | 58 | 59 | 60 |
|---|---|---|---|---|---|
| **  SYNTHETIC ELASTOMER  ** | | | | | |
| POLYISOBUTYLENE ELASTOMER | 17.1 | 16.7 | 11.7 | 6.2 | 11.6 |
| POLYVINYL ACETATE | 24.9 | 25.6 | 29.4 | 30.9 | 31.5 |
| **  ELASTOMER PLASTICIZERS  ** | | | | | |
| GLYCEROL ESTERS OF ROSIN | 6.8 | 8.0 | 10.7 | 14.6 | 19.8 |
| GLYCEROL ESTERS OF PART HYD ROSIN | — | — | — | — | — |
| **  FILLER  ** | | | | | |
| CALCIUM CARBONATE | — | — | — | — | — |
| TALC | 34.7 | 34.9 | 34.1 | 34.0 | 21.9 |
| **  SOFTENER  ** | | | | | |
| GLYCERYL TRIACETATE | 4.6 | 3.9 | 4.4 | 4.7 | 5.0 |
| GLYCEROL MONOSTEARATE | 5.8 | 5.7 | 4.3 | 4.6 | 4.9 |
| ACETYLATED MONOGLYCERIDE | 6.1 | 5.2 | 5.4 | 5.0 | 5.3 |
| TOTAL PERCENT | 100.0 | 100.0 | 100.0 | 100.0 | 100.0 |

EXAMPLES 61–64

| IDENTIFICATION - EXAMPLE #: GENERIC INGREDIENTS | 61 | 62 | 63 | 64 |
|---|---|---|---|---|
| **  SYNTHETIC ELASTOMER  ** | | | | |
| POLYISOBUTYLENE ELASTOMER | 15.7 | 13.2 | 5.4 | 7.9 |
| POLYVINYL ACETATE | 32.1 | 33.2 | 34.8 | 34.2 |
| **  ELASTOMER PLASTICIZERS  ** | | | | |
| GLYCEROL ESTERS OF ROSIN | 27.4 | 22.6 | 16.3 | 14.8 |
| GLYCEROL ESTERS OF PART HYD ROSIN | — | — | — | — |
| **  FILLER  ** | | | | |
| CALCIUM CARBONATE | — | — | 30.2 | 29.8 |
| TALC | 10.1 | 17.3 | — | — |
| **  SOFTENER  ** | | | | |
| GLYCERYL TRIACETATE | 4.9 | 5.0 | 5.3 | 5.3 |
| GLYCEROL MONOSTEARATE | 4.7 | 4.1 | 5.9 | 5.0 |
| ACETYLATED MONOGLYCERIDE | 5.1 | 4.6 | 2.1 | 3.0 |
| TOTAL PERCENT | 100.0 | 100.0 | 100.0 | 100.0 |

EXAMPLES 65–69

| IDENTIFICATION EXAMPLE #: GENERIC INGREDIENTS | 65 | 66 | 67 | 68 | 69 |
|---|---|---|---|---|---|
| **  SYNTHETIC ELASTOMER  ** | | | | | |
| POLYISOBUTYLENE ELASTOMER | 17.2 | 13.0 | 11.6 | 11.6 | 7.9 |
| POLYVINYL ACETATE | 37.3 | 37.1 | 39.9 | 41.2 | 34.2 |
| **  ELASTOMER PLASTICIZERS  ** | | | | | |
| GLYCEROL ESTERS OF ROSIN | 11.2 | — | — | — | — |
| GLYCEROL ESTERS OF PART HYD ROSIN | — | 19.8 | 19.9 | 19.4 | 14.8 |
| **  FILLER  ** | | | | | |
| CALCIUM CARBONATE | 20.6 | 16.5 | 15.0 | — | 29.8 |
| TALC | — | — | — | 14.0 | — |
| **  SOFTENER  ** | | | | | |
| GLYCERYL TRIACETATE | 5.6 | 5.6 | 6.0 | 6.2 | 5.3 |
| GLYCEROL MONOSTEARATE | 8.1 | 8.0 | 7.6 | 7.6 | 5.0 |
| ACETYLATED MONOGLYCERIDE | — | — | — | — | 3.0 |
| TOTAL PERCENT | 100.0 | 100.0 | 100.0 | 100.0 | 100.0 |

TABLE 3-continued

Wax-Free Gum Bases For Use In Bubble Gum

EXAMPLES 70-74

| IDENTIFICATION - EXAMPLE #: GENERIC INGREDIENTS | 70 | 71 | 72 | 73 | 74 |
|---|---|---|---|---|---|
| ** SYNTHETIC ELASTOMER ** | | | | | |
| POLYISOBUTYLENE ELASTOMER | 11.6 | 10.9 | 11.6 | 12.4 | 11.9 |
| POLYVINYL ACETATE | 37.8 | 37.5 | 31.4 | 31.0 | 37.0 |
| ** ELASTOMER PLASTICIZERS ** | | | | | |
| GLYCEROL ESTERS OF ROSIN | — | — | — | — | — |
| GLYCEROL ESTERS OF PART HYD ROSIN | 19.8 | 20.6 | 19.8 | 21.1 | 20.3 |
| ** FILLER ** | | | | | |
| CALCIUM CARBONATE | — | — | — | — | — |
| TALC | 17.0 | 19.5 | 22.7 | 22.2 | 16.7 |
| ** SOFTENER ** | | | | | |
| GLYCERYL TRIACETATE | 5.6 | 5.2 | 5.9 | 4.3 | 5.7 |
| GLYCEROL MONOSTEARATE | 3.2 | 3.1 | 2.9 | 2.5 | 4.5 |
| ACETYLATED MONOGLYCERIDE | 5.0 | 3.2 | 5.8 | 6.5 | 3.9 |
| TOTAL PERCENT | 100.0 | 100.0 | 100.0 | 100.0 | 100.0 |

The wax-free gum base of the invention constitutes about 5–95 weight percent of the chewing gum, more typically 10–50 weight percent of the chewing gum, and most commonly 20–35 weight percent of the chewing gum. The gum base is typically prepared by adding an amount of the elastomer, elastomer plasticizers and filler to a heated sigma blade mixer with a front to rear blade speed ratio of typically 2:1. The initial amounts of ingredients are determined by the working capacity of the mixing kettle in order to attain a proper consistency. After the initial ingredients have massed homogeneously, the balance of the elastomer plasticizer, filler, softeners, etc. are added in a sequential manner until a completely homogeneous molten mass is attained. This can usually be achieved in one to four hours, depending on the formulation. The final mass temperature can be between 60° C. and 150° C., more preferably between 80° C. and 120° C. The completed molten mass is emptied from the mixing kettle into coated or lined pans, extruded or cast into any desirable shape and allowed to cool and solidify.

Although the above method for making base is typical and applies to both chewing and bubble bases, it has been found that there is a preferred method for making the bubble bases described in this invention.

First, all of the polyvinyl acetate and portions of the polyisobutylene and filler are added and blended in a heated sigma blade mixer. Softeners such as glyceryl triacetate and/or acetylated monoglyceride are then added along with a second portion of each of polyisobutylene and filler. The acetylated monoglyceride may be added at the end of the process if desired and still not alter the chewing texture of the gum made from the base.

Next, the rest of the polyisobutylene and filler are added along with the elastomer plasticizer. Finally, the remaining ingredients such as glycerol monostearate and antioxidants may be added. Colorant may be added at any time during the mixing process and is preferably added at the start.

There are some variations to the above described preferred method which in no way limits the method as described. Those skilled in the art of gum base manufacture may be able to appreciate any minor variations.

In producing wax-containing gum bases high in polyvinyl acetate, and particularly those high in high molecular weight polyvinyl acetate, it is necessary to improve blending of the ingredients by removing the heat applied to the sigma blade mixer at some point in the process. This reduces the temperature of the gum base and causes greater compatibility of its ingredients. In the inventive gum base process for making the inventive gum base free of wax, there is no need to remove the heat applied. The degree of incompatibility is greatly reduced since there is no wax present. Nevertheless, heat is preferably removed at about 30 minutes to about 90 minutes into the mixing time of the base production process.

THE CHEWING GUMS OF THE INVENTION

In addition to the water-insoluble gum base, a typical chewing gum composition includes a water-soluble bulking agent and one or more flavoring agents. The wax-free gum base of the invention can be used in any typical chewing gum composition.

The water-soluble bulking agent of the chewing gum may include softeners, bulk sweeteners, high-intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, glycerol monostearate, glycerol triacetate, hydroxylated lecithin, agar, carrageenan, and combinations thereof. Aqueous sweetener solutions, syrups, and the like, such as those containing sorbitol, hydrogenated starch hydrolyzates, corn syrup and combinations thereof, may also be used as softeners and binding agents in the wax-free chewing gums of this invention.

Bulk sweeteners may constitute between 5–95% by weight of the chewing gum, more typically 20–80% by weight of the chewing gum and most commonly 30–60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, high maltose syrup, invert/high fructose syrup, maltotriose, glyceraldehyde, erythrose, xylose, lactose, leucrose, L-sugars, fructooligosaccharide and low calorie bulking/binding agents such as indigestible dextrin, guar gum hydrolyzate, oligofructose, polydextrose, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolyzates, maltitol, lactitol, erythritol, cellobiitol, and the like, alone or in combination.

High-intensity sweeteners may also be present and are commonly used with sugarless sweeteners. When used, high-intensity sweeteners typically constitute between 0.001–5% by weight of the chewing gum, preferably between 0.01–1% by weight of the chewing gum. Typically, high-intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, stevia and the like, alone or in combination.

In this invention, it is advantageous to use at least one controlled release sweetener with other optional active sweetening and bulking ingredients. The controlled release sweetener can be incorporated into the wax-free chewing gum after being modified, such as by encapsulating the sweetener, in order to modify its release. The most common ways of modifying the release of the active sweetening ingredients include spray drying, spray chilling, fluid-bed coating, coacervation, absorption, extrusion encapsulation, and other standard encapsulating techniques. The active sweetener ingredient may be modified in a multiple step process comprising any of the processes noted. Encapsulating agents that can be used include polyvinyl acetate, acrylic polymers and copolymers, carboxyvinyl polymer, polyamides, polystyrene, polyvinyl pyrrolidone, natural waxes, zein, shellac, agar, alginates, a wide range of cellulose derivatives including ethyl cellulose, methyl cellulose, sodium hydroxymethyl cellulose, and hydroxypropylmethyl cellulose and sodium carboxy methyl cellulose, dextrin, gelatin, modified starches, maltodextrin, gum arabic, xanthan gum, gelatin and pectin.

Controlled release of sweeteners is then obtained by selecting sweeteners that are, by their nature, fast release sweeteners and those which are, by their nature, slow release sweeteners, and blending them with the wax-free gum bases of the invention to obtain the wax-free chewing gum of this invention having both fast flavor release to compliment normally faster flavor release from wax-free chewing gums, and controlled sweetness (slower) release to sustain consumer pleasure during the chew. The blend is accomplished so as to provide controlled total sweetener release in a way so as to give an available sweetener profile comparable to, or similar to, the flavor profile available to the consumer. This perception of available flavor and sweetener profile provides enhanced consumer pleasure not only during the initial sweetener and flavor release, but throughout the chew.

Similarly, a sweetener which is normally a fast release sweetener may be modified to become a slow release sweetener, or a normally slow release sweetener may be modified to become a fast release sweetener. These may then be used in those combinations which provide effective sweetness release for the wax-free sweetners of this invention.

Combinations of sugar and/or sugarless sweetners may be used in the wax-free chewing gum. The sweetener may also function in the chewing gum in whole or in part as a water-soluble bulking agent. Additionally, the softener may also provide additional sweetness such as with aqueous sugar or alditol solutions.

Fast release sweeteners contemplated include such low-intensity sweeteners as sucrose, dried invert sugar, fructose, xylitol, and combinations thereof. Fast release sweeteners also include most high-intensity sweeteners, for example, those sweeteners selected from aspartame, acesulfame K, alitame, saccharin, cyclamate, used either alone, or in combination. However, these high-intensity sweeteners may be modified, as will be seen later, to become controlled release (or slow release) sweeteners.

Fast release sweeteners, as contemplated above, release about 60% of their sweetness, or more, in the first five (5) minutes of chewing. Further, the fast release sweeteners normally have a sweetness intensity at least about equal to, or greater than, that provided by sucrose. Therefore, these sweetners provide a relatively high impact of sweetness during the first three (3) minutes of chewing.

Fast release sweeteners may be found as natural sweeteners or they may be synthesized sweeteners. They may be treated or modified to provide for rapid or fast sweetness release. For example, sucralose, normally a slow release sweetener, when spray dried with maltodextrin gives a fast release sweetener.

Sweeteners which do not meet the requirements set forth above for fast release sweeteners are referred to herein as slow release sweetners. The slow release sweeteners may be natural or synthetic. They may be low sweetness, or high sweetness ingredients. They may be fast release sweeteners formulated, reacted or modified in such a way as to become slow release sweeteners.

Such slow release sweeteners include, but are not necessarily limited to, sorbitol, mannitol, dextrose, maltose, corn syrup solids, galactose, dextrin, hydrogenated starch hydrolyzates, maltitol, isomaltitol and the high-intensity sweetners sucralose, thaumatin, hydrochalcone and monellin. The slow release, or controlled release sweetners may also include the encapsulated, agglomerated, or absorbed sweetners, including, for example, encapsulated high intensity, normally fast release sweeteners.

For example, Yatka, in International Application No. PCT/US90/06038 (International Publ. No. WO 91/03147) taught a method of controlling release of stevioside in chewing gum. Stevioside, normally a fast release sweetener, was converted into a controlled release (or slow release) sweetener by coating, encapsulating, agglomerating, entrapping by absorption, or treating by multiple steps of encapsulating, agglomerating, and absorption. Ingredients such as the encapsulating agents mentioned above may be used.

Yatka, in International Application No. PCT/US88/04400 (International Publ. No. WO 89/03170) also teaches similar methods of controlling release of Acesulfame K in chewing gums. Also, in International Application No. PCT/US89/01269 (International Publ. No. WO 90/06061), Yatka demonstrates controlled release of Alitame in chewing gum.

Similar controlled release sweeteners including sucralose; Yatka, International Application No. PCT/US89/05296 (International Publ. No. WO 90/07859), Glycyrrhizin; Yatka, International Application No. PCT/US90/02255 (International Publ. No. WO 90/07864); and Dihydrochalcones; Yatka, International Application No. PCT/US90/04002 (International Publ. No. 90/13994) have been taught.

In addition to the above International Patent Applications/Publications, all of which are incorporated herein by reference, the following U.S. patents have taught various techniques of providing for either slowed release of sweeteners from, or in some cases, modified flavor release from, as providing for improved shelf life of, chewing gums or other digestible or consumable products:

U.S. Pat. No. 4,139,639, Bahosky et al.
U.S. Pat. No. 4,230,687, Sair et al.
U.S. Pat. No. 4,384,004, Cea et al.
U.S. Pat. No. 4,386,106, Merritt et al.
U.S. Pat. No. 4,515,769, Merritt et al.
U.S. Pat. No. 4,597,970, Sharma et al.
U.S. Pat. No. 4,634,593, Stroz et al.
U.S. Pat. No. 4,986,991, Yatka et al.
U.S. Pat. No. 5,039,530, Yatka et al.
U.S. Pat. No. 5,041,294, Patel et al.
U.S. Pat. No. 5,100,678, Reed et al.

As those familiar with the art will recognize, either or both fast release and slow release sweeteners may serve as bulking agents or binders in chewing gum formulations, and the same is true for our wax-free chewing gums. The wax-free chewing gums do, however, preferably contain additional binding agents, since binding is one of the functions served by wax, when present in chewing gums.

Flavoring agents should generally be present in the chewing gum in an amount within the range of about 0.1–15% by weight of the chewing gum, preferably between about 0.2–5% by weight of the chewing gum, most preferably between about 0.5–3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

Optional ingredients such as colors, food acidulants, emulsifiers, pharmaceutical agents, vitamins, and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

The following formulas are illustrative of types of products which may be produced. All ingredient levels are expressed in weight percent.

Examples 75–93 illustrate non-tack and reduced-tack chewing gums of the present invention. As can be seen, there is much latitude in the selection of flavors, sweeteners and ingredient levels. Examples 75–80 illustrate use of the invention with sugar gums while Examples 81–91 describe sugarless gums. Preferably, the chewing gums manufactured according to the invention will have a combination of slow release and fast release sweeteners, which combination provides for comparable, or similar sweetness release profiles when measured with flavor release profiles. Most preferably, the combination is created such that the perceived rate of sweetness release is similar to the perceived rate of flavor release. Sweetener release profile is a measure of the sensory perception of sweetener intensity released per unit time. Flavor release profile is similarly defined.

Encapsulated sweeteners may be used to extend sweetness and flavor and to protect the sensitive sweeteners from degradation during storage. Certain naturally slow release sweeteners, such as sucralose, may be encapsulated or codissolved and spray-dried to provide fast release, if the powdered or crystalline sweetener would normally provide for slow release. Low moisture products having moisture levels below 2% are also within the scope of these inventions, for example in Examples 83 and 85 which follow.

TABLE 4

Sugar-Containing Non-Tack And Reduced Tack Gums
EXAMPLES 75–80

| Example | 75 | 76 | 77 | 78 | 79 | 80 |
|---|---|---|---|---|---|---|
| Base Example # | 19 | 17 | 11 | 19 | 16 | 16 |
| Base % | 20.12 | 23.20 | 27.20 | 21.22 | 22.10 | 24.00 |
| Flavor | 0.20 (Spray Dried Peppermint) | 1.10 (Cinnamon) | 1.55 (Wintergreen) | 0.10 (Spray Dried Menthol) | 0.10 (Peppermint) | 0.90 (Peppermint) |
| Flavor | 0.91 (Spearmint) | — | 0.10 (Spray Dried Menthol) | 0.85 (Spearmint) | 0.90 (Spearmint) | 0.10 (Spearmint) |
| Sugar | 58.70 | 60.96 | 55.60 | 60.60 | 60.34 | 61.19 |
| Sorbitol | 1.20 | 0.68 | — | 0.68 | 0.70 | — |
| Encapsulated Acesulfame K | 0.10 | 0.30 | — | 0.30 | 0.41 | — |
| Encapsulated Aspartame | 0.10 | — | 0.2 | — | — | 0.1 |
| Calcium Carbonate | 3.10 | — | — | — | — | — |
| Corn Syrup | 13.47 | 12.11 | 13.71 | 14.80 | 14.00 | 12.10 |

TABLE 4-continued

Sugar-Containing Non-Tack And Reduced Tack Gums
EXAMPLES 75–80

| Example | 75 | 76 | 77 | 78 | 79 | 80 |
|---|---|---|---|---|---|---|
| Lecithin | — | 0.15 | 0.10 | 0.15 | 0.15 | 0.20 |
| Glycerin | 2.10 | 1.50 | 1.54 | 1.30 | 1.30 | 1.41 |
| TOTAL | 100 | 100 | 100 | 100 | 100 | 100 |

TABLE 5

Sugarless Non-Tack And Reduced Tack Gums

EXAMPLES 81–86

| Example | 81 | 82 | 83 | 84 | 85 | 86 |
|---|---|---|---|---|---|---|
| Base Example # | 3 | 19 | 7 | 24 | 24 | 8 |
| Base % | 24.00 | 27.11 | 21.21 | 29.48 | 22.58 | 18.11 |
| Flavor | 1.07 (Citrus Oils) | 0.98 (Peppermint) | 0.97 (Spearmint Oil) | 1.15 (Peppermint Oil) | 1.47 (Cinnamon Flavor) | 1.00 (Wintergreen Oil) |
| Flavor | — | 0.20 (Spray Dried Menthol) | 0.15 Peppermint Oil) | 0.21 (Spearmint Oil) | — | 0.27 (Peppermint Oil) |
| Sorbitol | 61.37 | 55.08 | 59.79 | 55.15 | 60.01 | 57.53 |
| Calcium Carbonate | — | — | 2.11 | — | 2.00 | 4.70 |
| Sorbitol Solution | 6.42 | — | — | — | — | — |
| Coevaporated Lycasin (7.5% water, 25% glycerin) | — | 9.16 | — | 8.11 | — | 8.88 |
| Glycerin | 4.70 | 4.11 | 12.11 | 3.11 | 11.61 | 7.10 |
| Mannitol | 2.10 | 3.10 | 3.11 | 2.66 | 2.00 | 2.00 |
| Encapsulated Aspartame | 0.19 | — | 0.25 | — | — | 0.21 |
| Free Aspartame | 0.05 | — | 0.10 | — | — | — |
| Encapsulated Alitame | — | 0.05 | — | 0.10 | — | — |
| Free Alitame | — | — | — | 0.03 | — | 0.10 |
| Encapsulated Sucralose | — | — | — | — | 0.21 | — |
| Free Sucralose | — | 0.08 | — | — | 0.02 | — |
| Lecithin | 0.10 | 0.15 | 0.20 | — | 0.10 | 0.10 |
| TOTAL | 100 | 100 | 100 | 100 | 100 | 100 |

EXAMPLES 87–91

| Example | 87 | 88 | 89 | 90 | 91 |
|---|---|---|---|---|---|
| Base Example # | 3 | 19 | 13 | 52 | 44 |
| Base % | 24.7 | 19.2 | 24.0 | 19.2 | 19.2 |
| Sorbitol | 6.0 | — | — | — | — |
| Mannitol | 1.0 | — | — | — | — |
| Corn Syrup | — | 6.0 | 24.5 | 18.5 | 6.0 |
| Dextrose | — | 9.8 | — | 9.8 | 9.7 |
| Lactose | — | 5.0 | — | — | 5.0 |
| Glycerin | 16.4 | 9.8 | 0.4 | 1.4 | 8.9 |
| Lecithin | 0.2 | — | — | — | — |
| Flavor | 1.4 | 0.9 | 1.0 | 0.9 | 0.9 |
| Oligofructose | — | 50.0 | 50.0 | — | — |
| Fructooligosaccharide | — | — | — | 50.0 | 50.0 |
| Color | 0.05 | — | — | — | — |
| Aspartame | 0.25 | 0.2 | — | 0.1 | 0.2 |
| Alitame | — | — | 0.1 | 0.1 | 0.1 |
| Low Mol. Weight Indigestible Dextrin | 50.0 | — | — | — | — |
| TOTAL | 100 | 100 | 100 | 100 | 100 |

Examples 92–97 are sugarless products made with the non-reduced-tack bases of the present invention. Examples 98–103 are equivalent sugar products.

TABLE 6

Regular Tack Sugarless Gums
EXAMPLES 92-97

| Example | 92 | 93 | 94 | 95 | 96 | 97 |
|---|---|---|---|---|---|---|
| Base Example # | 32 | 44 | 51 | 36 | 52 | 44 |
| Base % | 21.76 | 22.07 | 24.00 | 20.97 | 26.00 | 20.08 |
| Flavor | 0.92 (Peppermint Oil) | 0.77 (Spearmint Oil) | 0.83 (Spearmint Oil) | 0.99 (Cinnamon Flavor) | 0.97 (Peppermint Oil) | 1.04 (Peppermint Oil) |
| Flavor | — | 0.24 (Peppermint Oil) | — | — | — | 0.16 (Spray Dried Menthol) |
| Sorbitol | 46.44 | — | — | 63.61 | 51.40 | — |
| Coevaporated Lycasin (7.5% Water, 25% Glycerin) | 8.47 | 7.84 | 11.20 | 7.76 | — | — |
| Glycerin | 5.19 | 4.91 | 2.10 | 4.20 | 12.00 | — |
| Mannitol | 1.77 | — | — | 2.01 | 3.11 | — |
| Xylitol | 15.11 | — | 12.11 | — | 6.27 | 78.16 |
| Palatinit (Hydrogenated Isomaltulose) | — | 63.97 | 49.60 | — | — | — |
| Aspartame | 0.1 | — | — | 0.14 | — | 0.14 |
| Encapsulated Aspartame | — | — | — | 0.22 | — | 0.22 |
| Alitame | — | 0.02 | 0.02 | — | 0.1 | — |
| Encapsulated Alitame | — | 0.04 | 0.04 | — | — | — |
| Sucralose | 0.11 | — | — | — | 0.15 | — |
| Lecithin | 0.13 | 0.14 | 0.10 | 0.10 | — | 0.20 |
| TOTAL | 100 | 100 | 100 | 100 | 100 | 100 |

TABLE 7

Regular Tack Sugar Gums
EXAMPLES 98-103

| Example | 98 | 99 | 100 | 101 | 102 | 103 |
|---|---|---|---|---|---|---|
| Base Example # | 67 | 52 | 44 | 39 | 51 | 40 |
| Base % | 22.38 | 20.60 | 20.08 | 23.11 | 20.02 | 21.01 |
| Flavor | 0.89 (Peppermint Oil) | 0.58 (Spearmint Oil) | 0.86 (Peppermint Oil) | 0.91 (Peppermint Oil | 1.21 (Fruit Flavor) | 0.98 (Wintergreen Flavor) |
| Flavor | — | — | — | 0.21 (Spearmint Oil) | — | 0.20 (Spray Dried Menthol) |
| Encapsulated Aspartame | 0.1 | — | — | 0.05 | — | — |
| Encapsulated Acesulfame K | — | 0.1 | — | 0.05 | 0.15 | 0.1 |
| Sucralose | — | — | 0.1 | — | — | 0.09 |
| Sugar | 58.29 | 59.39 | 62.56 | 59.97 | 63.59 | 62.41 |
| Corn Syrup | 17.20 | 18.50 | 15.40 | 14.70 | 13.88 | 14.19 |
| Glycerin | 1.09 | 0.83 | 1.00 | 1.00 | 1.05 | 1.02 |
| Lecithin | 0.05 | — | — | — | .10 | — |
| TOTAL | 100 | 100 | 100 | 100 | 100 | 100 |

Examples 104-115 are examples of inventive coated pellet gums made with non-wax bases. The gum products of these examples are formed into pellets or balls for subsequent coating. Examples 104-109 are sugar pellets which could be coated with sugar syrups. Such syrups may contain modified starch (0 to 6.0%), compatible flavors and colors (0 to 0.30%), vegetable gums such as gum arabic and cellulose derivatives such as hydroxypropyl methyl cellulose (0 to 20%) in addition to sucrose or starch hydrolyzate in an aqueous solution.

Examples 110-115 are sugarless pellets which can be coated with sugar alcohol solutions such as those of sorbitol, xylitol and palatinit. These syrups may also contain the same modifiers listed above for sugar syrups.

In both cases (sugar and sugarless) dry coating agent (sugar or sugar alcohol) may be added between layers of coating syrup, a process known as dry charging or soft panning.

Coating may be carried out by any suitable process, most often using a conventional pan, side vented pans, high capacity pans such as those made by Driam or Dumouline, or by continuous panning techniques.

TABLE 8

Sugar Pellet Gums For Coating
EXAMPLES 104–109

| Example | 104 | 105 | 106 | 107 | 108 | 109 |
|---|---|---|---|---|---|---|
| Base Example # | 40 | 36 | 37 | 51 | 52 | 47 |
| Base % | 24.32 | 24.28 | 24.30 | 24.27 | 25.17 | 24.33 |
| Flavor | 0.55 (Spearmint Oil) | 0.73 (Peppermint Oil) | 2.56 (Licorice Powder) | 0.77 (Fruit Flavor) | 0.47 (Spearmint Oil) | 0.61 (Spearmint Oil) |
| Flavor | — | — | 0.60 (Menthol/Anethol) | — | 0.15 (Peppermint Oil) | — |
| Sugar | 52.92 | 52.77 | 50.84 | 52.76 | 52.49 | 52.74 |
| Corn Syrup | 22.16 | 22.12 | 21.60 | 22.11 | 21.62 | 22.22 |
| Encapsulated Alitame | 0.05 | — | — | — | 0.05 | — |
| Encapsulated Acesulfame K | — | — | 0.1 | — | — | 0.05 |
| Encapsulated Aspartame | — | 0.1 | — | — | 0.05 | 0.05 |
| Sucralose | — | — | — | 0.1 | — | — |
| TOTAL | 100 | 100 | 100 | 100 | 100 | 100 |

TABLE 9

Sugarless Pellet Gums For Coating
EXAMPLES 110–115

| Example # | 110 | 111 | 112 | 113 | 114 | 115 |
|---|---|---|---|---|---|---|
| Base Example | 33 | 26 | 40 | 29 | 35 | 35 |
| Base % | 31.01 | 33.00 | 32.71 | 33.03 | 30.97 | 31.45 |
| Flavor | 1.20 (Spearmint Oil) | 1.30 (Peppermint Oil) | 1.09 (Spearmint Oil) | 1.50 (Fruit Flavor) | 1.01 (Peppermint Oil) | 1.31 (Fruit Flavor) |
| Flavor | — | 0.50 (Menthol) | 0.17 (Peppermint Oil) | 0.50 (Lemon Flavor) | 0.21 (Spray Dried Menthol) | — |
| Sorbitol | 51.46 | 44.06 | 45.56 | 43.81 | 46.69 | 45.99 |
| Calcium Carbonate | 10.01 | 13.00 | 12.16 | 12.93 | 13.04 | 13.33 |
| Glycerin | 6.14 | 8.00 | 8.00 | 7.98 | 7.82 | 7.30 |
| Encapsulated Aspartame | 0.12 | 0.14 | 0.21 | 0.25 | 0.18 | 0.62 |
| Free Aspartame | 0.06 | — | 0.10 | — | 0.08 | — |
| TOTAL | 100 | 100 | 100 | 100 | 100 | 100 |

Inventive bubble gums may be prepared using the bubble gum bases of the present invention such as those listed in Examples 56–74. Illustrative formulations are given as Examples 116–127. Examples 116–121 are sugar bubble gum formulas. Note that Examples 117 and 121 use blends of two inventive bases. This is a technique to optimize processing and texture properties while minimizing the necessity of maintaining different bases for each product and without having additional custom bases compounded. Examples 122–127 are sugarless bubble gum formulas.

TABLE 10

Sugar Bubble Gums
EXAMPLES 116–121

| Example | 116 | 117 | 118 | 119 | 120 | 121 |
|---|---|---|---|---|---|---|
| Base Example # | 69 | 72/74 | 74 | 72 | 59 | 72/69 |
| Base % | 24.02 | 11.00/11.00 | 22.20 | 20.01 | 19.99 | 9.00/13.00 |
| Flavor | 0.80 (Fruit Flavor) | 0.85 (Cream Soda) | 0.60 (Lemon Lime) | 0.60 (Blueberry) | 0.00 (Strawberry) | 0.80 (Cream Soda) |
| Flavor | — | 0.03 (Vanilla) | — | — | — | 0.02 (Vanilla) |
| Sugar | 55.05 | 59.44 | 55.85 | 58.90 | 59.65 | 57.88 |
| Corn Syrup | 17.68 | 16.53 | 19.54 | 17.99 | 16.88 | 17.44 |
| Lecithin | 0.60 | 0.35 | 0.40 | 0.51 | 0.50 | 0.45 |
| Glycerin | 1.74 | 0.70 | 0.40 | 0.81 | 1.49 | 1.31 |
| Color | 0.06 (Red) | — | 0.01 (Green) | 0.48 (Blue) | 0.08 (Red) | — |
| Citric Acid | — | — | 0.90 | 0.60 | 0.70 | — |
| Encapsulated Alitame | 0.05 | — | — | — | 0.05 | — |
| Encapsulated | — | 0.1 | — | — | 0.05 | 0.05 |

TABLE 10-continued

Sugar Bubble Gums
EXAMPLES 116-121

| Example | 116 | 117 | 118 | 119 | 120 | 121 |
|---|---|---|---|---|---|---|
| Aspartame Encapsulated Acesulfame K | — | — | 0.1 | — | — | 0.05 |
| Sucralose | — | — | — | 0.1 | — | — |
| TOTAL | 100 | 100 | 100 | 100 | 100 | 100 |

TABLE 11

Sugarless Bubble Gums
EXAMPLES 122-127

| Example | 122 | 123 | 124 | 125 | 126 | 127 |
|---|---|---|---|---|---|---|
| Base Example # | 63 | 64 | 69 | 71 | 71 | 60 |
| Base % | 24.00 | 24.59 | 28.00 | 29.12 | 30.10 | 26.71 |
| Flavor | 1.20 (Fruit Flavor) | 1.41 (Fruit Flavor) | 1.71 (Grape Flavor) | 1.34 (Strawberry Flavor) | 1.11 (Lemon Flavor) | 1.23 (Peach Flavor) |
| Sorbitol | 51.47 | 51.78 | 46.03 | 49.65 | 46.39 | 49.33 |
| Calcium Carbonate | 5.00 | 4.31 | — | — | — | — |
| Talc | — | — | 3.71 | 3.44 | 1.99 | 3.44 |
| Lecithin | 1.00 | 0.91 | 0.84 | 0.61 | 0.86 | 0.75 |
| Citric Acid | — | — | — | 0.31 | 0.31 | — |
| Malic Acid | — | — | 0.21 | 0.11 | 0.31 | 0.16 |
| Tartaric Acid | — | — | 0.36 | 0.11 | — | — |
| Glycerin | 17.00 | 10.00 | 9.00 | 15.09 | 8.21 | 12.00 |
| Lycasin/Glycerin | — | 6.79 | 9.61 | — | 10.41 | 6.00 |
| Color | 0.02 (Red) | 0.01 (Red) | 0.06 (Red/Blue) | 0.02 (Red) | 0.05 (Yellow) | 0.01 (Red) |
| Encapsulated Aspartame | 0.27 | — | 0.41 | — | — | 0.31 |
| Free Aspartame | 0.04 | 0.1 | 0.06 | — | 0.17 | 0.06 |
| Acesulfame K | — | — | — | 0.11 | — | — |
| Encapsulated Alitame | — | 0.10 | — | — | — | — |
| Sucralose | — | — | — | 0.09 | 0.09 | — |
| TOTAL | 100 | 100 | 100 | 100 | 100 | 100 |

While the embodiments of the invention disclosed herein are presently considered to be preferred, various modifications and improvements can be made without departing from the spirit and scope of the invention. The scope of the invention is indicated in the appended claims, and all changes that come within the meaning and range of equivalency of the claims are intended to be embraced therein.

We claim:

1. A substantially wax-free chewing gum having controlled sweetener release comprising a wax-free chewing gum base comprising:

| Ingredient | Wt. Percent of Gum Base |
|---|---|
| Synthetic Elastomer | about 20–60 weight percent, |
| Natural Elastomer | about 0–30 weight percent, |
| Elastomer Plasticizer | about 5–55 weight percent, |
| Filler | about 4–40 weight percent, |
| Fats, Oils, Softeners | about 5–40 weight percent; | said wax-free chewing gum further comprising at least one flavoring agent, at least one water-soluble bulking agent, and at least one controlled release sweetener ingredient.

2. The chewing gum of claim 1, wherein the elastomers comprises a natural elastomer selected from the group consisting of jelutong, lechi caspi, perillo, sorva, massaranduba balata, massaranduba chocolate, nispero, rosin dinha, chicle, gutta hang kang, smoked or liquid latex, guayule, chiquibul, crown gum, pendare, venezuelau chicle, leche de vaca, niger gutta, tunu, chilte, and combinations thereof.

3. The chewing gum of claim 1 wherein the elastomer comprises a synthetic elastomer selected from the group consisting of polyisobutylene, butadienestyrene copolymer, polyvinyl acetate, vinyl acetatevinyl laurate copolymer, polyisoprene, isobutyleneisoprene copolymer, and combinations thereof.

4. The chewing gum of claim 1 wherein the elastomer plasticizer is selected from the group consisting of glycerol esters of rosin, glycerol esters of partially hydrogenated rosin, glycerol esters of polymerized rosin, glycerol esters of partially dimerized rosin, partially hydrogenated methyl esters of rosin, glycerol esters of tal oil rosin, pentaerythritol esters of rosin, methyl esters of rosin, pentaerythritol esters of partially hydrogenated rosin, synthetic terpene resin, natural terpene resin, and combinations thereof.

5. The chewing gum of claim 1 wherein the filler is selected from the group consisting of calcium carbonate, magnesium carbonate, talc, ground limestone, magnesium silicate, aluminum silicate, clay, alumina, titanium dioxide, mono-, di- and tri-calcium phosphates, cellulose, and combinations thereof.

6. The chewing gum of claim 1 wherein the softener is selected from the group consisting of tallow, hydrogenated tallow, hydrogenated vegetable oils, partially hydrogenated vegetable oils, cocoa butter, glycerol monostearate, mono-, di- and triglycerides, acetylated monoglycerides, glyceryl triacetate, lecithin, fatty acids, diacetin, lanolin, and combinations thereof.

7. The chewing gum of claim 1, wherein the gum base consists primarily of:
   about 25 to about 45 weight percent synthetic elastomer;
   about 10 to about 40 weight percent elastomer plasticizer;
   about 5 to about 30 weight percent filler; and
   about 15 to about 35 weight percent softener.

8. The chewing gum of claim 1, wherein the gum base consists primarily of:
   about 12 to about 30 weight percent natural elastomer;
   about 20 to about 40 weight percent synthetic elastomer;
   about 5 to about 25 weight percent elastomer plasticizer;
   about 4 to about 25 weight percent filler; and
   about 15 to about 30 weight percent softener.

9. The chewing gum of claim 1, wherein the gum base consists primarily of:
   about 30 to about 60 weight percent synthetic elastomer;
   about 5 to about 55 weight percent elastomer plasticizer;
   about 10 to about 35 weight percent filler; and
   about 5 to about 25 weight percent softener.

10. A bubble gum comprising the chewing gum base of claim 9.

11. The bubble gum base of claim 10, prepared by:
    adding a first portion of synthetic elastomer and a first portion of filler to a mixer;
    adding softener to the mixer along with a second portion of synthetic elastomer and a second portion of filler;
    adding elastomer plasticizer to the mixer along with a third portion of synthetic elastomer and a third portion of filler;
    blending the ingredients together; and
    removing heat at about 30 minutes to about 90 minutes into the mixing time of the base production process.

12. A wax-free chewing gum having both reduced tack properties and controlled sweetness release, comprising:
    a water-soluble bulking agent;
    one or more flavoring agents; and
    a water insoluble chewing gum base including about 25 to about 45 percent synthetic elastomer, about 10 to about 40 percent elastomer plasticizer, about 5 to about 30 percent filler, and about 15 to about 35 percent softener, by weight of the gum base, and
    at least one controlled release high intensity sweetener ingredient.

13. The wax-free chewing gum of claim 13, wherein the synthetic elastomer is selected from the group consisting of styrene-butadiene copolymer, isopreneisobutylene copolymer, polyisobutylene, polyvinyl acetate and combinations thereof.

14. The wax-free chewing gum of claim 13, wherein the elastomer plasticizer is selected from the group consisting of glycerol ester of wood rosin, glycerol ester of partially hydrogenated wood rosin, terpene resins and combinations thereof.

15. The wax-free chewing gum of claim 13, wherein the filler is selected from the group consisting of calcium carbonate, talc, and combinations thereof.

16. The wax-free chewing gum of claim 13, wherein the softener is selected from the group consisting of hydrogenated vegetable oils, glycerol monostearate, lecithin, and combinations thereof.

17. A wax-free chewing gum, comprising:
    a water-soluble bulking agent;
    one or more flavoring agents; and
    a water insoluble chewing gum base including about 12 to about 30 percent natural elastomer, about 20 to about 40 percent synthetic elastomer, about 5 to about 25 percent elastomer plasticizer, about 4 to about 25 percent filler, and about 15 to about 30 percent softener, by weight of the chewing gum base, and
    at least one controlled release sweetener having a release profile comparable to the release profile of at least one of the flavoring agents.

18. The wax-free chewing gum of claim 17, wherein the natural elastomer is selected from the group consisting of jelutong, sorva, chicle, massaranduba balata, and combinations thereof.

19. The wax-free chewing gum of claim 17, wherein the synthetic elastomer is selected from the group consisting of styrene-butadiene elastomer, isoprene-isobutylene copolymer, polyisobutylene, polyvinyl acetate, and combinations thereof.

20. The wax-free chewing gum of claim 17, wherein the elastomer plasticizer is selected from the group consisting of glycerol esters of partially hydrogenated rosin, methyl esters of rosin, glycerol esters of rosin, terpene resin, and combinations thereof.

21. The wax-free chewing gum of claim 17, wherein the filler is selected from the group consisting of calcium carbonate, talc, and combinations thereof.

22. The wax-free chewing gum of claim 17, wherein the softener is selected from the group consisting of hydrogenated vegetable oils, glycerol monostearate, lecithin, and combinations thereof.

23. A wax-free chewing gum, comprising:
    a water-soluble bulking agent;
    one or more flavoring agents; and
    a water insoluble chewing gum base including about 20 to about 60 weight percent synthetic elastomer, about 0 to about 30 weight percent natural elastomer, about 5 to about 55 weight percent elastomer plasticizer, about 10 to about 35 weight percent filler, and about 5 to about 25 weight percent softener; and
    a combination of sweeteners having a sweetness release profile comparable to a flavor release profile of the flavoring agent, including at least one controlled release sweetener.

24. The wax-free chewing gum of claim 23, wherein the synthetic elastomer is selected from the group consisting of polyisobutylene, polyvinyl acetate, and combinations thereof.

25. The wax-free chewing gum of claim 23, wherein the elastomer plasticizer is selected from the group consisting of glycerol esters of partially hydrogenated rosin, glycerol esters of rosin, and combinations thereof.

26. The wax-free chewing gum of claim 23, wherein the filler is selected from the group consisting of calcium carbonate, talc, and combinations thereof.

27. The wax-free chewing gum of claim 23, wherein the softener is selected from the group consisting of glycerol monostearate, acetylated monoglyceride, glycerol triacetate, and combinations thereof.

28. A wax-free chewing gum comprising gum base, flavor and at least one controlled release sweetener; said gum base including:
- about 20 to about 60 weight percent synthetic elastomer;
- 0 to about 30 weight percent natural elastomer;
- about 5 to about 55 weight percent elastomer plasticizer;
- about 4 to about 40 weight percent filler; and
- about 5 to about 40 weight percent softener, wherein the controlled release sweetener comprises at least one fast release sweetener and at least one slow release sweetener.

29. The chewing gum of claim 28 wherein the gum has reduced tack to dental surfaces.

30. The chewing gum of claim 28 wherein the gum is sugarless.

31. The chewing gum of claim 28 wherein the gum is in the form of a coated pellet or ball.

32. The chewing gum of claim 28 wherein the gum is a bubble gum.

33. The chewing gum of claim 1, wherein the controlled release sweetener comprises a high intensity sweetener with modified release characteristics.

34. The chewing gum of claim 33, wherein the high intensity sweetener is encapsulated.

35. The chewing gum of claim 33, wherein the high intensity sweetener is spray dried.

36. The chewing gum of claim 33, wherein the high intensity sweetener is selected from the group consisting of sucralose, aspartame, salts of acesulfame, alitame, saccharin and its salts, cyclamic acid and its salts, glycyrrhizin, dihydrochalcones, thaumatin, monellin, stevia, and combinations thereof.

37. The chewing gum of claim 33, wherein the high intensity sweetener is combined with another high intensity sweetener to provide modified release characteristics.

38. The wax-free chewing gum of claim 12, wherein the high intensity sweetener ingredient comprises an encapsulated high intensity sweetener.

39. The wax-free chewing gum of claim 12, wherein the high intensity sweetener ingredient comprises a spray dried high intensity sweetener.

40. The wax-free chewing gum of claim 12, wherein the high intensity sweetener ingredient comprises at least one fast release sweetener and at least one slow release sweetener.

41. The wax-free chewing gum of claim 12, wherein the high intensity sweetener ingredient comprises a sweetener selected from the group consisting of sucralose, aspartame, salts of acesulfame, alitame, saccharin and its salts, cyclamic acid and its salts, glycyrrhizin, dihydrochalcones, thaumatin, monellin, stevia, and combinations thereof.

42. The wax-free chewing gum of claim 17, wherein the controlled release sweetener comprises a high intensity sweetener having modified release characteristics.

43. The wax-free chewing gum of claim 42, wherein the high intensity sweetener is encapsulated.

44. The wax-free chewing gum of claim 42, wherein the high intensity sweetener is spray dried.

45. The wax-free chewing gum of claim 42, wherein the high intensity sweetener is selected from the group consisting of sucralose, aspartame, salts of acesulfame, alitame, saccharin and its salts, cyclamic acid and its salts, glycyrrhizin, dihydrochalcones, thaumatin, monellin, stevia, and combinations thereof.

46. The wax-free chewing gum of claim 42, wherein the high intensity sweetener is combined with another sweetener to provide modified release characteristics.

47. The wax-free chewing gum of claim 23, wherein the controlled release sweetener comprises a high intensity sweetener having modified release characteristics.

48. The wax-free chewing gum of claim 28, wherein the controlled release sweetener comprises a high intensity sweetener having modified release characteristics.

* * * * *

UNITED STATES PATENT AND TRADEMARK OFFICE
CERTIFICATE OF CORRECTION

PATENT NO. : 5,437,876
DATED : August 1, 1995
INVENTOR(S) : Steven P. Synosky

It is certified that error appears in the above-indentified patent and that said Letters Patent is hereby corrected as shown below:

Column 29;
In claim 13, line 1, delete "13" and substitute --12--.

Signed and Sealed this

Seventh Day of May, 1996

Attest:

BRUCE LEHMAN

Attesting Officer      Commissioner of Patents and Trademarks